June 23, 1959  K. R. JOHNSON  2,892,154
MEASURING INSTRUMENT
Filed Aug. 1, 1956  2 Sheets-Sheet 1

INVENTOR.
KENNETH R. JOHNSON
BY Arthur H. Swanson
ATTORNEY.

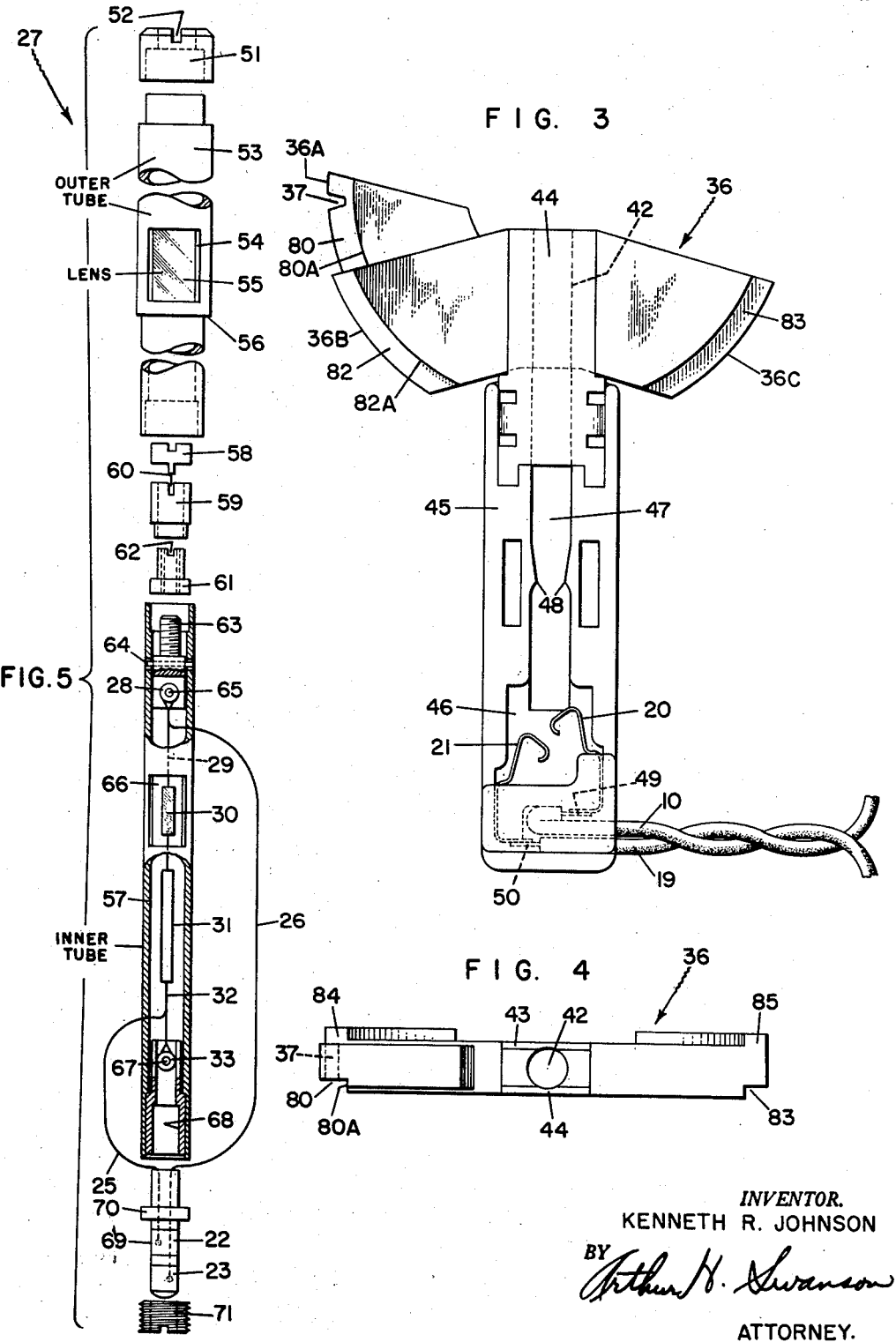

United States Patent Office 2,892,154
Patented June 23, 1959

2,892,154

MEASURING INSTRUMENT

Kenneth R. Johnson, Denver, Colo., assignor to Minneapolis-Honeywell Regulator Company, Minneapolis, Minn., a corporation of Delaware Application August 1, 1956, Serial No. 601,458

4 Claims. (Cl. 324—97)

This invention relates to an improved galvanometer of the d'Arsonval type. A plurality of such galvanometers are adapted to be mounted together in a bank and are especially suitable for multi-channel-oscillography. The movable coil of this galvanometer is mounted in a removable pencil which can be inserted into or removed from the magnet structure.

It is an object of this invention to provide a galvanometer which is characterized by its greater compactness, adjustability, and adaptability. These advantages are secured by providing an improved means of conducting to the coil of the galvanometer the electricity which is to be measured by the galvanometer. This conductor includes a pair of ring contacts on the pencil. These ring contacts are connected to the movable coil of the galvanometer. A pair of spring contacts are provided on a portion of the magnet structure into which portion the pencil can be inserted and from which portion the pencil can be withdrawn. These spring contacts engage the ring contact, when the pencil is inserted into the magnetic structure and conduct the current or voltage, which is to be measured, to the galvanometer coil.

A better understanding of the present invention may be had from the following detailed description when read in connection with the accompanying drawings, in which:

Fig. 3 is a side elevation of the pole piece and the sheath;

Fig. 4 is a top or plan view of Fig. 3; and

Fig. 5 is an exploded view of the pencil.

Figure 1:
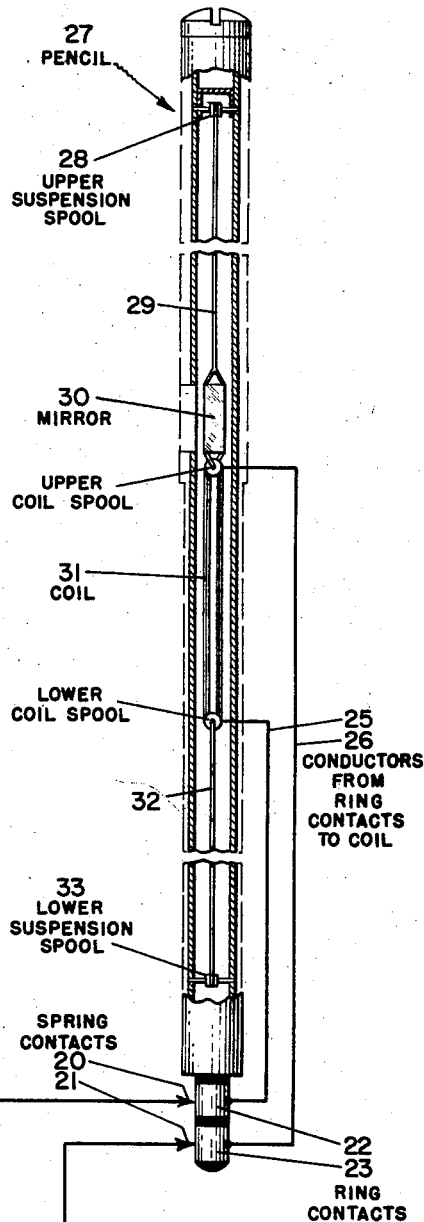
Fig. 1 is a mechanical and electrical diagram.
Figure 1:
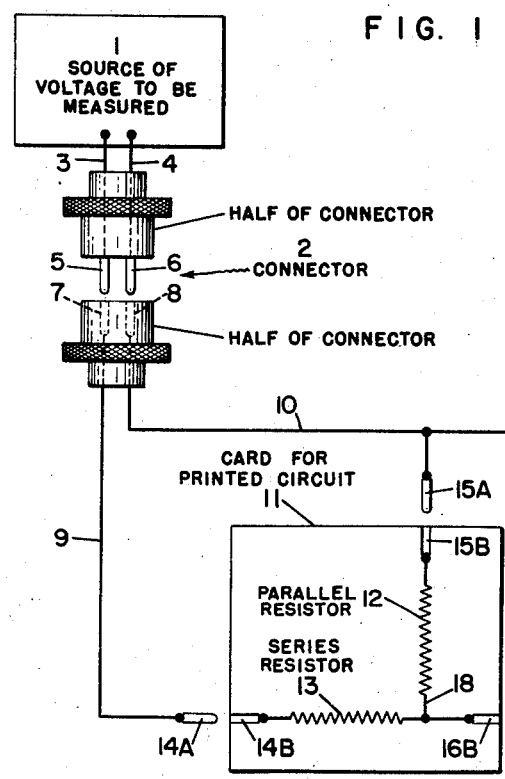

Referring to Fig. 1, the source of variable voltage or current (which is to be measured) is indicated at 1. This variable voltage or current may be any small voltage or current which is analogous to a variable which is to be measured. Examples of such variables are such static and dynamic phenomena as strain, vibration, pressure, acceleration, temperature, impact, and many others. These variables occur during dynamic tests on aircraft and guided missiles; on structural tests of buildings, bridges, and ships; in performing tests of heavy machinery and electrical equipment, in tests evaluating the riding qualities of automobiles, buses, trucks, and railroad coaches; and in studies of the human brain, electro-cardiograph measurements, and similar analysis in physiological and medical research.

Source 1 is connected to the galvanometer by means of a connector 2. Lead wires 3 and 4 lead from source 1 to an insulating plug which forms half of the connector 2 and which has projections 5 and 6 on it. The other half of the connector 2 has sockets 7 and 8 in it adapted to receive the projections 5 and 6 therein. Only two of the projections 5 and 6 and only two of the sockets 7 and 8 are shown. Normally, two conductors, such as connector 2, are employed. Each carries sufficient pairs of these projections and sufficient pairs of these sockets to accommodate half the sources which are to be connected to the particular bank of galvanometers. As many as twelve galvanometers may be mounted together in one bank or magnet assembly.

From the sockets 7 and 8 of the lower connector half, a pair of electric connectors 9 and 10 lead to the galvanometer.

The sensitivity of a galvanometer is measured with D.C. current. This sensitivity is then independent of the damping applied to the galvanometer. However, the frequency response of the galvanometer is definitely controlled by the amount of damping applied. Not only the coil resistance of the galvanometer, but all characteristics of the galvanometer must be pre-determined in order to match a specified damping resistance. It might also be pointed out that this same magnet structure and contact assembly, may be used with fluid damp galvanometers as well as the electro-magnetic damped galvanometers. This damping is secured by means of a series resistor 13 and a parallel resistor 12 connected between the source and the galvanometer.

Advantage may be taken of printed circuit techniques to secure this damping circuit. A card 11 may have parallel resistor 12 and series resistor 13 printed or otherwise located thereon. Connector 10 connects with a branch connector which terminates in a contact 15A. Connector 9 terminates in a contact 14A. A contact 16A forms one end of a connector 19 which is connected to spring contact 21 at its opposite end. When the card 11 bearing the damping circuit on it is mounted on the magnet assembly, the contacts 14A, 15A, and 16A engage contacts 14B, 15B, and 16B printed or otherwise located on the card 11 and connected respectively to one end of series resistor 13, to one end of parallel resistor 12, and to one branch of a connector 18 which connects the opposite end of series resistor 13 and the opposite end of parallel resistor 12 together.

Spring contact 20 is connected to one end connector 10.

Pencil 27, in which the movable coil 31 of the galvanometer is housed, has at its lower end a pair of exposed ring contacts 22 and 23.

Figure 2:
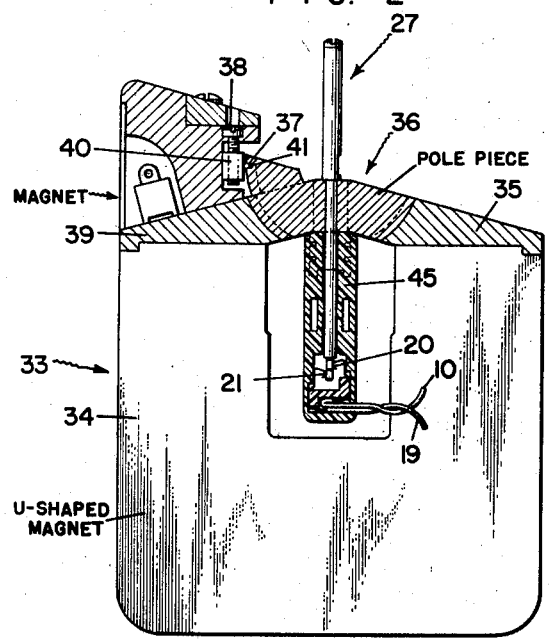
Fig. 2 is an elevation of the magnet assembly with the pencil in position with parts shown in transverse, vertical, cross section.

Fig. 2 shows that the pencil 27 is adapted to be readily inserted into or removed from the magnet assembly 33.

When the pencil 27 is in position in the magnet assembly 33, the galvanometer is in operating condition because the ring contacts 22 and 23 engage the spring contacts 20 and 21. Electricity is conducted from the source 1 through connector 2 and the damping circuit comprised of parallel resistor 12 and series resistor 13 to galvanometer coil 31 by means of spring contacts 20 and 21, ring contacts 22 and 23, and connectors 25 and 26.

Fig. 2 shows magnet assembly 33 in greater detail. U-shaped magnet 34 carries yokes 35 and 39 at its upper end. Pole piece 36 is adapted to be mounted in yokes 35 and 39 and to be rotated relative thereto. Pole piece 36 is rotated by means of screw 38 which passes through a hole in adjusting block blank, which is attached to yoke 39 and screw threadedly engages block 40 having projection 41 thereon. Projection 41 fits in notch 37 in pole piece 36.

When screw 38 is turned, block 40 reciprocates and projection 41, by its engagement with notch 37, causes pole piece 36 to turn in yoke pieces 35 and 39.

Figs. 3 and 4 show pole piece 36 in greater detail. Pole piece 36 has a hole 42 passing vertically through it and communicating, at its lower end, with space 47 in sheath 45. Space 47 has flat side walls except for a sloping portion 48 of suitable size to yieldingly engage the sides of the outer tube 53 forming part of pencil 27. Space 47 communicates, at its lower end, with a larger space 46 in which the contacts 20 and 21 are mounted.

Contact 20 is soldered or otherwise secured to the bare end of conductor 49 which forms part of the connector 10. Contact 21 is soldered or otherwise secured to the bare end 50 which forms part of connector 19.

Poles piece 36 has three curved faces 36A, 36B, and 36C. Curved faces 36B and 36C mate with or slide along suitably shaped curved faces in yokes 35 and 39.

Pole piece 36 has a notch 80 cut out of the curved surface 36A and a notch 82 cut out of the curved surface 36B. The wall 80A is further away from the curved surface 36A than the wall 82A is from the curved surface 36B. A notch 83 is cut in surface 36C. From the opposite side of pole piece 36 project curved shoulders 84 and 85. Shoulder 84 is adapted to fit in and slide along notch 82. Shoulder 85 fits in and slides along notch 83. A pair of side pieces 43 and 44 secure the sheath 45 to the pole piece 36 and insures that the contacts 20 and 21 are accurately located with respect to the axis of the holes 42, 47, and 46.

Fig. 5 discloses the details of the pencil 27. Outer tube 53 has, at its upper end, cap 51 with notch 52 in the upper surface thereof. Window 54 passes through the wall of outer tube 53 and has lens 55 mounted therein. Intermediate its end, outer tube 53 has shoulder 56 on it. Shoulder 56 limits the extent to which pencil 27 can be inserted into magnet structure 33 because shoulder 56 engages the upper surface of the pole piece 36 and prevents further downward movement of pencil 27. Inner tube 57 has a window 66 passing through its wall. Window 66 is normally aligned with window 54 in upper tube 53, so that mirror 30 is visible through lens 55.

Inner tube 57 has a mounting for the upper coil spool 28. This mounting comprises an upper coil spool pin 65. Pin 65 is mounted on a screw 63 which is guided in the inner tube 57 by means of pin 64 which rides in slots in the inner tube 57. Screw 63 has screw threaded engagement with a collar 61 having a slot 62 in the upper end thereof. Inner collar 61 is partially surrounded by outer collar 59 having notch 60 in the upper surface thereof adapted to receive a projection on cap 58.

Inner tube 57 also has a support for lower suspension spool 33. This support comprises a pin 67 mounted on an end tube 68. Ring contacts 22 and 23 are mounted on the outer surface of support 69 which has a ring 70 on its outer surface forming a closure for the lower end of end tube 68. Hollow screw 71 is adapted to be slid over contacts 22 and 23 and to secure the contact support in place. Filament 29 suspends from upper spool 28 and supports mirror 30 and coil 31 thereon. Lower filament 32 connects the lower end of coil 31 to lower spool 33. Electricity is led from the ring contacts 22 and 23 to coils 31 by means of conductors 25 and 26.

What is claimed is:

1. A galvanometer, including, a U-shaped permanent magnet, yokes mounted on the ends of the legs of said magnet and having curved surfaces, a pole piece rotatably mounted in and having curved surfaces interfitting with the curved surfaces on said yokes and having a hole passing vertically therethrough, a sheath mounted on and rotatable with said pole piece, contacts mounted on said sheath and located accurately with respect to the axis of said hole, a pencil comprising an outer tube having a window through the wall thereof, a lens in said window, an inner tube located in said outer tube and having a window through the wall thereof normally aligned with the window in said outer tube, a support adjacent the upper end of said inner tube, a support adjacent the lower end of said inner tube, a pair of filaments each mounted at one end on one of said supports, a mirror supported by said filaments and normally located in alignment with said window so as to be visible therethrough, a coil supported by said filaments and normally located in the field of said magnet, a shoulder on the outer surface of said outer tube and adapted to engage the upper surface of said pole piece and thereby to limit the insertion of said pencil into said pole piece, a pair of ring contacts mounted on and carried by the outer surface of said pencil and adapted to engage said contacts in said sheath, and conductors connecting said ring contacts with said coil.

2. A galvanometer, including, a U-shaped permanent magnet, yokes mounted on the ends of the legs of said magnet and having curved surfaces, a pole piece rotatably mounted in and having curved surfaces interfitting with the curved surfaces on said yokes and having an opening passing vertically therethrough, a sheath mounted on and rotatable with said pole piece, contacts mounted on said sheath and located accurately with respect to the axis of said hole, a pencil having a window through the wall thereof, a lens in said window, a support adjacent the upper end of said pencil, a support adjacent the lower end of said pencil, a pair of filaments each mounted at one end on one of said supports, a mirror supported by said filaments and normally located in alignment with said window so as to be visible therethrough, a coil supported by said filaments and normally located in the field of said magnet, a shoulder on the outer surface of said pencil and adapted to engage the upper surface of said pole piece and thereby to limit the insertion of said pencil into said magnet assembly, a pair of ring contacts mounted on and carried by the outer surface of said pencil and adapted to engage said stationary contacts in said sheath, and conductors connecting said ring contacts with said coil.

3. A galvanometer, including, a U-shaped permanent magnet, yokes mounted on the ends of the legs of said magnet and having curved surfaces, a pole piece rotatably mounted in and having curved surfaces interfitting with the curved surfaces on said yokes and having a hole passing vertically therethrough, contacts mounted on said pole piece and located accurately with respect to the axis of said hole, a pencil comprising an outer tube having a window through the wall thereof, a lens in said window, an inner tube located in said outer tube and having a window through the wall thereof normally aligned with the window in said outer tube, a support adjacent the upper end of said inner tube, a support adjacent the lower end of said inner tube, a pair of filaments each mounted at one end on one of said supports, a mirror supported by said filaments and normally located in alignment with said window so as to be visible therethrough, a coil supported by said filaments and normally located in the field of said magnet, a shoulder on the outer surface of said outer tube adapted to engage the upper surface of said pole piece and thereby to limit the insertion of said pencil into said magnet assembly, a pair of ring contacts mounted on and carried by the outer surface of said pencil and adapted to engage said stationary contacts, and conductors connecting said ring contacts with said coil.

4. A galvanometer, including a U-shaped permanent magnet, yokes mounted on the ends of the legs of said magnet and having curved surfaces, a pole piece rotatably mounted in and having curved surfaces interfitting with the curved surfaces on said yokes and having an opening passing vertically therethrough, contacts mounted on said pole piece and located accurately with respect to the axis of said hole, a pencil comprising an outer tube having a window through the wall thereof, a lens in said window, an inner tube adapted to be located in said outer tube and having a window through the wall thereof normally aligned with the window in said outer tube, a support adjacent the upper end of said inner tube, a support adjacent the lower end of said inner tube, a mirror rotatably supported by said inner tube and normally located in alignment with said window so as to be visible therethrough, a coil rotatably supported by said inner tube, a shoulder on the outer surface of said outer tube adapted to engage the upper surface of said pole piece and thereby to limit the insertion of said pencil into said magnet assembly, a pair of ring contacts mounted on and carried by the outer surface of said pencil and adapted to engage said stationary contacts, and conductors connecting said ring contacts with said coil.

References Cited in the file of this patent

UNITED STATES PATENTS

| | | |
|---|---|---|
| 2,268,526 | Palmer | Dec. 30, 1941 |
| 2,356,608 | O'Bryan | Aug. 22, 1944 |
| 2,571,776 | Staff | Oct. 16, 1951 |
| 2,698,417 | Hathaway | Dec. 28, 1954 |